United States Patent Office 2,765,232
Patented Oct. 2, 1956

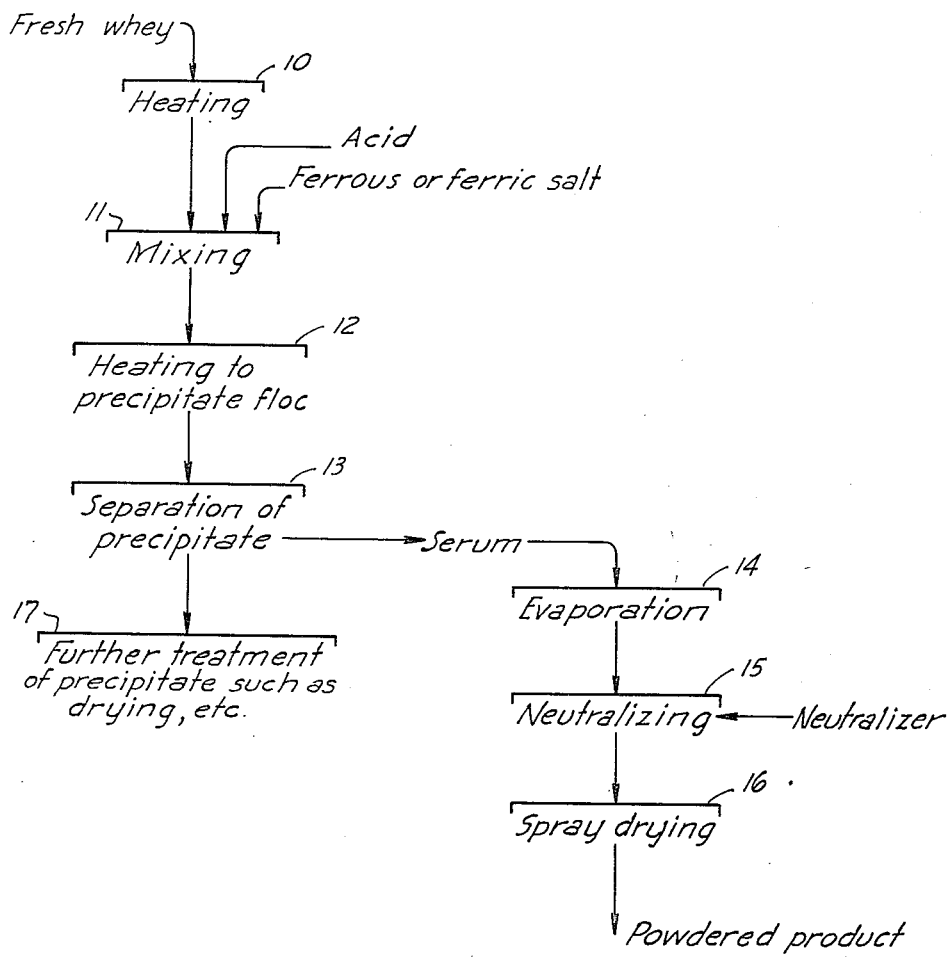

2,765,232

WHIPPING PRODUCTS AND PROCESS OF MANUFACTURE

Nelson E. Rodgers and Richard G. Henika, Appleton, and Raymond E. Miersch, Kimberly, Wis., assignors to Western Condensing Company, San Francisco, Calif., a corporation of California Application July 7, 1952, Serial No. 297,462

9 Claims. (Cl. 99—57)

This invention relates generally to edible aerating agents capable of imparting whipping properties to various mixes, and to processes for their manufacture.

In the baking and confection industries fresh egg or dried egg albumin is used in various mixtures to impart whipping properties. Particular reference can be made to cake mixes of the angel food and chiffon type, and to mixes used to make boiled frostings, meringues, marshballows, seafoams, nougats, mazettas, frappes, fruit whips, and the like. Because of the relatively high cost of egg albumin, effort shave been made to produce less expensive aerating agents that can be used in place of all or part of the egg albumin which would normally be employed. Such products have not met with general acceptance, which we attribute to such factors as cost of manufacture, relatively poor whipping properties, lack of compatibility with other ingredients when used in certain mixes, flavor impairment, and the like.

In general it is an object of the present invention to provide a new edible foaming or aerating agent having many of the useful properties of foaming materials such as egg albumin, gelatin and soya derivatives, and a novel process for its commercial manufacture.

Another object of the invention is to provide a product and process of the above character which will provide the desired product at relatively low cost.

Another object of the invention is to provide a product and process of the above character which employs fresh whey as the principal source material.

Another object is to provide a product of the above character which is of high quality with respect to nutritive value, palatability and flavor.

Another object of the invention is to provide a marketable high protein edible by-product.

Additional objects of the invention will appear from the following description in which the preferred embodiments have been set forth in detail in conjunction with the accompanying drawing.

The present invention involves treatment of fresh liquid whey to remove foam depressant substances and to modify the constitution of the protein by fractional precipitation and removal of a part of the protein, thus providing a serum having good foaming or aerating properties. Preferably the serum is spray dried to form a marketable powdered product. Various factors of the process can be adjusted to yield products of different degrees of foamability, stability and suitability for different applications. The process also results in the production of a high protein by-product which can be further processed in various ways.

The whey employed should be of edible quality, such as is produced from the manufacture of cheese or casein. In practice edible quality sweet cheddar cheese whey, from which the whey cream has been removed centrifugally, has given good results. Ordinarily such whey has a pH of 6.2 to 6.3, and a fat content not exceeding 0.04–0.06% as determined by the Mojonnier method.

According to our process, a substantial amount of the whey protein is precipitated by the use of an iron salt while the whey is at a pH in the range of pH 3.0–4.7. Various soluble non-toxic ferric or ferrous salts can be employed, such as ferric chloride. Assuming that the liquid whey initially has a pH of 6.2–6.3, the addition of a small amount of ferric chloride or like salt causes a moderate drop in pH. Preferably the amount of iron salt employed is relatively small and insufficient to detrimentally affect the end products. Thus it has been satisfactory to use from 0.0015 to 0.01 molar iron in the form of a soluble salt like ferric chloride, 0.0015–0.003 molar being preferred.

To adjust the pH to the desired range, the whey is acidulated by use of a suitable edible acid, such as sulphuric, hydrochloric, phosphoric, lactic, citric, or acetic. Lactic acid has been found to be particularly effective due to its distinctive effect in improving foaming power independently of its function as an acidulant. After addition of both the iron salt and the acid, the pH should be within the range of about pH 3.0–4.7 (3.6–4.2 preferred).

Assuming that the whey being supplied to the process is at a temperature below 35° C., it preferably is preheated to a temperature of from about 45 to 50° C., before adding the iron salt and acid. Such preheating is a precautionary measure to avoid precipitation of a protein fraction which is insoluble at lower temperatures in the presence of iron. Precipitation of such a fraction is undesirable because it appears that on subsequent rapid heating, the presence of any such precipitated fraction predisposes an excessive loss of protein, which concomitant reduction in foam stability of the final product. The requirement for such preheating is less important when slow heating is employed for the subsequent protein precipitating operation, because apparently the reversibly insolubilized protein has an opportunity to redissolve before heat coagulation occurs. Likewise it appears that preheating becomes less important when very low concentrations of iron are employed.

The temperature at which precipitation of protein takes place is a factor affecting the properties of the final product. Temperatures of the order of 100° C., or higher, are to be avoided, because they cause an irreversible coagulation of a high percentage of the protein. While temperatures of the order of from 65 to 95° C. have been found workable under some circumstances, it has been found that a more critical range of 70 to 80° generally is required to insure a satisfactory product.

Assuming that the iron salt and acid are added while the whey is at a temperature well below 65° C., heating to a temperature within the range of 65 to 95° C. causes relatively rapid precipitation of a protein floc. According to observations this fractional precipitation comprises largely coagulated whey protein, together with small amounts of iron and surface active material. The elevated temperature can be maintained over a relatively wide period of from say one minute to five hours. It is preferable however to commence cooling the batch of material after a period of from about 15 to 30 minutes, whereby excessive precipitation is arrested, thus avoiding excessive loss of foam stabilizing protein. Cooling can be carried out gradually to a temperature of the order of 50 to 60° C., during which time the mixture is subject to some convection currents, which favor agglomeration of the flocs into readily sedimentable masses. After agglomerated flocs have been formed, they should not be disrupted by excessive agitation, such as by pumping or by mechanical mixing. Cooling to a temperature below 65° C. serves to arrest further precipitation.

After cooling, the material is subjected to a suitable separating operation for the removal of the precipitated floc. This can be carried out for example by holding a batch of the material quiescent for a period of from 10 to 24 hours, during which time the floc settles out to the bottom of the vessel. The clear or slightly turbid supernatant serum is then separated from the floc by decantation. The yield of serum is of the order of 50 to 90 volume percent of the whey, depending upon the conditions employed during precipitation. For commercial operations a yield of from 75 to 90% is desirable.

The serum produced as described above can be used as an egg white substitute after concentration by evaporation, but preferably it is processed to form a powdered product. Thus the serum can be concentrated by vacuum evaporation and then converted to a powder by spray drying. During vacuum evaporation care should be taken to avoid use of excessive temperatures. Thus the temperature during evaporation should not exceed 82° C., and preferably should be less than about 77° C. Also it is desirable to adjust the pH by the use of a suitable neutralizing agent. Thus calcium hydroxide or preferably sodium hydroxide can be added to the serum or concentrate prior to spray drying. The amount of neutralizer employed can be such as to adjust the pH to 4.2–6.0 (pH 4.6–5.0 being preferred). The spray drying operation can be carried out by use of conventional equipment such as is employed for the commercial spray drying of skim or whole milk.

A flow sheet of the process as described above is illustrated in the drawing. In operation 10 the fresh liquid whey is preheated to a temperature of about 45–50° C., after which it is mixed at 11 with a ferrous or ferric salt, and the pH adjusted with an acid. This material is then heated at 12 to precipitate a part of the protein, and the resulting precipitate carrying anti-foaming substances, is separated from the serum in operation 13. The serum is treated to vacuum evaporation at 14, after which the concentrate is neutralized at 15, and subjected to spray drying at 16 to produce a final powdered product. The separated precipitate is shown being subjected to further treatment at 17, to form a marketable by-product.

The characteristics of the by-product precipitate are influenced by various factors of the process, such as the iron concentration, and the temperature employed for precipitation. In general when this precipitated material is dried it provides a product containing 20 to 30% protein, 55 to 60% lactose, 7 to 8% ash, and about 2% fat. If desired, this protein can be purified by repeated washing with water, and separating the same from the wash water by suitable methods such as decantation or centrifuging.

The dried serum product obtained from the above described process is a whipping agent useful in the preparation of various food products and mixes. It can be used, for example, as an ingredient in cake mixes of the angle food or chiffon type, boiled frostings, meringues, marshmallows, seafoams, nougats, mazettas, frappes, fruit whips, chiffon pies, and the like. When used in such products or mixes it can replace wholly or in part whipping agents making use of egg albumin, and/or soy bean products, and in certain cases gelatin products. It has a delicately acid, clean flavor, in contrast with the off flavor possessed by many egg white substitute agents. Because of the low cost of the source of material employed, and the relatively simple nature of the process, our product can be manufactured at relatively low cost.

In order to evaluate the influence of process variables on our product, we have used a laboratory technique involving preparation of a boiled frosting as follows: A measured amount of the dry whipping agent (generally 20–60 grams) was dispersed in 120 ml. of water at 25° C. by hand mixing with a wire whip in a five quart Hobart mixer bowl. Where liquid concentrate samples were employed, the amount of water was adjusted accordingly. The mixture was then whipped at high speed with a Hobart mixer to two-thirds of anticipated maximum volume and/or until the foam began to become rigid or pull away from the beater. The whipping time varied from 0.5 to 4.0 minutes, depending upon the product employed. To this initial whip was added a syrup prepared from 360 gm. sucrose, 90 gm. dextrose, and 125 ml. water, cooked to 120° C. in a shallow pan with stirring. The hot syrup was threaded slowly into the foam over a period of one minute while whipping at high speed. The whipping was continued for an additional 50–60 seconds, after adding the syrup.

The percent overrun was derived according to the following formula from the weights of equal volumes of whipped and unwhipped mixes measured in a shallow cylindrical cup 3.3 cm. deep by 7.5 cm. wide:

$$\frac{\text{Weight unwhipped} - \text{weight whipped}}{\text{weight whipped}} \times 100 = \text{percent overrun}$$

Suitable precautions were taken to avoid air pockets, and the brimful measuring cup (for measuring out equal volumes) was leveled with a spatula. The unwhipped mix was prepared from the ingredients mentioned above less 52 ml. of water normally lost in boiling the sugar syrup to 120° C.

The stiffness (body, rigidity) was measured by a penetrometer and expressed as depth of penetration in centimeters in 15 seconds into a level surface of void-free whip in a cup. Thus the stiffness index is inversely proportional to the penetrometer reading. The penetrometer cone or plunger was devised from a 40 ml. tapered tip centrifuge tube incorporated into a suitable guiding, loading and scale reading arrangement.

We used spray dried confectioners' egg albumin as a standard of comparison of whipping performance and product adaptability in this work. Using 17 gm. of egg albumin in the above described boiled frosting formula, an overrun of 380–390% and a stiffness of 3.3–3.6 cm. are usually obtained. As a general rule this level of performance is regarded as a criterion of a satisfactory whipping product, although it is recognized that translation of this comparison to other mixes may not always produce comparable results.

An untreated spray dried edible grade whey, when applied in the above test, yields an overrun of less than 150% and stiffness values poorer than 11 cm. A stiffness value in excess of 5.0 cm. reflects a poor body and runny consistency.

Products made in accordance with our process, when tested as described above, yield an overrun of the order of 400 to 700%, and a stiffness index of 2.5–3.5 cm.

All of the factors involved in developing the desired foaming properties in our product are not clearly understood. However, according to our observations certain substances are removed from the whey which have an inhibiting effect upon foaming, or in other words are in the nature of defoamers. Particular reference can be made to the removal of ether soluble substances, presumably lipid, phospholipid or lipoprotein in character. It has been observed that our process effects a reduction of Monjonnier extractable lipid from the 0.40–0.06% fat (wet basis) normally characteristic of separated whey, to 0.01% or less. However, it does not follow that reduction of fat to this level is of itself sufficient to insure proper whipping properties. Fat can be reduced by simple acid heat coagulation of protein, but the presence of an iron salt together with a critically controlled pH and temperature, play an important part in obtaining a product with satisfactory foamability and stability. Furthermore, use of the preferred lactic acid contributes to obtaining satisfactory foamability and stability. According to our observations, the conditions just specified in some way alter the surface active properties of the foamable proteins involved.

While products made in accordance with the process outlined above are satisfactory for many commercial applications, improved products can be made by concentrating the active components. Thus prior to spray drying the serum concentrate can be subjected to crystallization for the removal of a substantial amount of the lactose content. Another method which has been used with good results is to remove a substantial amount of the lactose and salts by dialysis of the serum through a suitable semipermeable membrane. The latter method has been found particularly effective for concentrating the foaming constituents. The percentage of lactose removed, either by crystallization or dialysis, may vary in accordance with the characteristics which one desires to develop in the final product. By way of example, excellent products can be made by removing from 45 to 50% of the lactose content.

As previously stated, lactic acid imparts foaming properties superior to the use of other acids like sulphuric, etc. Edible grade lactic acid can be used for this purpose. Instead of adding the lactic acid, it is possible to develop it in the whey by fermentation with Lactobacillus bulgaricus. Thus prior to introducing the iron salt, edible whey can be pasteurized at 61° C. for 30 minutes, and after cooling to 37° C., inoculated with 5 volume percent of Lactobacillus bulgaricus starter. After the acidity has developed to a suitable value, such as pH 4.5, a proper amount of iron salt can be added with the result that the pH is lowered to a value such as 4.0. The process can now proceed as previously described.

The preferred procedure described above involves precipitation of protein at an elevated temperature of the ordere of from 65 to 95° C. By considerably increasing the concentration of iron salt, it is possible to carry out precipitation at temperatures in the range of 0 to 60° C. Whereas the precipitate produced by the process as first described is relatively insoluble, the precipitate produced at lower temperatures is readily soluble by adjustment of a water suspensions to pH 5.5 to 6.0 or higher. By way of example the concentration of iron salt can be of the order of 0.005 to 0.02 molar, and the temperature for precipitation can be of the order of from 0° to 60° C. The amount of acid used can be such as to adjust the pH to about 3.0 to 4.0.

The product obtained by low temperature precipitation can be purified the same as previously described, that is, by repeating washing. Also it can be purified by dissolving in pure water, followed by acidulation to pH 3.5 to 4.5 to reprecipitate. The resulting precipitate is then removed by decantation or centrifuging. Successive redissolution and precipitation can be carried out as desired. The addition of iron is not necessary for reprecipitation. This water soluble protein may be highly useful in certain pharmaceutical applications.

While the last described low temperature process may have useful applications for certain types of products, the foamability of the serum produced is generally inferior to the process as first described, and palatability is slightly affected because of the high concentration of iron employed.

Examples of our preferred processes for preparation of the aerating agent are as follows:

*Example No. 1*

2,800 lbs. of sweet cheddar cheese whey pH 6.4, were warmed from an initial temperature of 14° C. up to 50° C. in a stainless steel jacketed tank. Upon thoroughly mixing 2 lbs. 3 oz. of ferric chloride hexahydrate (0.003 molar iron) with the whey, the pH fell to 5.6. The whey was further acidified to pH 4.0 with 11 lbs. of 80 per cent edible grade lactic acid. This mixture was heated to 78–81° C. by pumping through a plate heater into a 3,000 lb. capacity precipitation vessel. The temperature was reduced to 60° C. over a period of 4.5 hours.

After allowing the protein precipitate to settle over a period of 16 hours, the clear supernatant serum, comprising about 67 volume per cent of the original whey, was decanted. The serum was concentrated to 30 per cent solids in a calandria at 50° C. After adjusting the concentrate to pH 4.6 with sodium hydroxide, the product was spray dried.

The spray dried product having a clean flavor and odor and light color yielded an overrun of 604% and a stiffness index of 2.6 when applied in a boiled frosting test. The product contained 8.24% protein and 0.12% fat.

*Example No. 2*

2,800 lbs. of cheddar cheese whey at pH 6.4 and 10° C. were treated with 1 lb. 1.5 oz. of ferric chloride hexahydrate (0.0015 molar iron) thus dropping the pH to 6.0. The reaction was further adjusted to pH 4.0 by addition of 14 lbs. of 80% edible lactic acid.

An 800 lb. portion of this mixture was heated to 80° C. in a plate heater and held at this temperature for somewhat less than one minute in a timing tube. From the timing tube the whey was cooled immediately to 65° C. by passage through a plate cooler to a settling tank. The remaining 2,000 lbs. of acidified whey were heated to 80° C. in the plate heater and upon pumping directly to a second settling tank, the temperature fell to 76° C. The temperature was further reduced by air cooling to 60° C. in about 5 hours and to 43° C. in 16 hours. At 16 hours the supernatant serums were decanted from both tanks, yielding 93 and 92 volume per cent in the first and second tanks respectively.

Aliquots of both serums were evaporated in a laboratory evaporator at 40–50° C. and evaluated by the boiled frosting test. The whipping qualities of the two preparations were practically identical with 550 and 566% overrun and stiffness indices of 2.7 and 2.8 cm. respectively for the short and long heating period treatments. On a dry basis the serum concentrates analyzed 8.23 and 8.36% protein and 0.13 and 0.13% fat respectively.

*Example No. 3*

50,000 lbs. of sweet cheddar cheese whey, pH 6.25, were warmed to 50° C. in a tubular heat exchanger and collected in a mixing tank. 38 lbs. of ferric chloride hexahydrate (.003 molar) were added and the pH was adjusted to 4.0 with 331 lbs. of 50% lactic acid. The mixture was then heated to 74° C. in a tubular heater and collected in a settling tank. The temperature was reduced to 50° C. in three hours and to 39° C. in four and one-half hours by means of a cold water spray ring. After settling for 28.5 hours, the clear supernatant serum was decanted with a yield of about 60 volume per cent. The serum was concentrated in a double effect tubular falling film evaporator to 50–55 per cent solids at a temperature not exceeding 76° C., adjusted to pH 4.7 with sodium hydroxide, and spray dried.

The boiled frosting prepared from this product showed an overrun of 520% and 2.9 cm. stiffness index. The gross composition of the dried product was as follows:

|   | Per cent |
|---|---|
| Protein | 8.2 |
| Fat | 0.13 |
| Lactose (anhydrous) | 69.3 |
| Acid (as lactic) | 4.3 |
| Ash | 9.9 |
| Moisture (toluene) | 2.4 |

*Example No. 4*

A 30,000 pound batch of fresh sanitary whey (pH 6.43) was preheated to 50° C. and collected in a horizontal tank equipped with an agitator. A water solution containing 23 pounds of $FeCl_3 \cdot 6H_2O$ was pumped into the preheated whey. This amount of $FeCl_3 \cdot 6H_2O$ gave a concentration of 0.003 molar. Upon introducing the iron salt, the pH dropped to 5.7. 178 lbs. of 50% lactic acid was added to further drop the pH to 4.01. After thorough mixing, the batch was heated to 77° C. and collected in a horizontal jacketed tank. 45 minutes were required for the heating operation. The protein settled out relatively completely after about 5.5 hours. The batch was then permitted to cool and after 7 hours the temperature was at 71° C. The serum was then decanted off and spray dried. The product gave an overrun of 534% and a stiffness of 2.3 cm.

In general the foregoing process makes possible a high quality whipping agent which can be used in a wide variety of food products and mixes. It can be used either by itself or with varying amounts of fresh egg white, dried egg albumin, soya whipping agents or gelatine.

We claim:

1. In a process for the manufacture of an edible aerating agent, treating liquid whey to effect precipitation of a portion of its protein by adding thereto a small amount of non-toxic soluble iron salt to provide a concentration of from 0.0015 to 0.01 molar, while the whey is at a pH within the range of 3.0 to 4.7 and while the whey is at a temperature within the range of 65 to 95° C., and removing the precipitate from the resulting serum to provide a serum having the desired properties.

2. A process as in claim 1 in which lactic acid is added to acidulate the whey to thereby provide a pH of from 3.0 to 4.7.

3. In a process as in claim 1 in which said serum is converted to the form of a dry powdered product.

4. As a new article of manufacture, the dry powdered product resulting from the process of claim 3.

5. In a process for the manufacture of an edible aerating agent, treating liquid whey to effect precipitation of a portion of its protein by adding thereto a small amount of non-toxic soluble iron salt to provide an iron concentration of from about 0.0015 to 0.01 molar, while the whey is acidulated by the presence of added lactic acid to provide a pH of from 3.0 to 4.7, and while the whey is at a treatment temperature of the order of from 65 to 95° C., gradually cooling the material after precipitation of the protein and permitting the precipitate to settle, removing the supernatant serum, and then drying the serum to form a dry powdered product having the desired properties.

6. A process as in claim 5 in which a portion of the lactose content of the serum is removed without further precipitation of protein, prior to converting the material to a dry powdered product.

7. In a process for the manufacture of an edible aerating agent, treating liquid whey to effect precipitation of a portion of its protein by adding thereto a small amount of a non-toxic soluble iron salt to provide a concentration of from about 0.0015 to 0.003 molar, adding lactic acid to attain a pH of from 3.6 to 4.2, and then heating to a temperature of the order of from 70 to 80° C., separating serum from the resulting protein precipitate, and then drying the serum to form a dry powdered product having the desired properties.

8. A process as in claim 7 in which the serum after its removal from the precipitate, is neutralized to pH 4.6 to 5.0 and then dried to form a powdered product.

9. A process for the manufacture of edible aerating agents capable of imparting whipping properties to various mixes, the agents providing an overrun of the order of 400 to 700% and a stiffness index of from 2.5 to 3.5 cm., said process comprising adding to a liquid whey a small amount of a non-toxic soluble iron salt sufficient to provide a concentration of from about 0.0015 to 0.003 molar and also adding lactic acid to reduce the pH of the whey to from 3.6 to 4.2, permitting a portion of the protein content of the whey to precipitate while the whey is at a temperature of from 70 to 80° C., maintaining the material quiescent for an extended holding period during which the material cools gradually to a temperature below about 65° C. whereby the precipitate is caused to settle from the serum, removing the serum by decantation, neutralizing the serum to a pH of 4.2 to 6.0, and then drying the serum to obtain a product having the desired properties.

References Cited in the file of this patent

UNITED STATES PATENTS

| | | |
|---|---|---|
| 1,787,754 | Meyer | Jan. 6, 1931 |
| 2,437,080 | Daniel | Mar. 2, 1948 |
| 2,606,181 | Pratt et al. | Aug. 5, 1952 |